(12) United States Patent
Khetrapal et al.

(10) Patent No.: US 8,700,460 B2
(45) Date of Patent: *Apr. 15, 2014

(54) SYSTEM FOR EXCHANGING SALES LEADS

(75) Inventors: Saurabh Khetrapal, Palo Alto, CA (US); Karandeep Sandhu, Mountain View, CA (US)

(73) Assignee: Sales Portal, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,046

(22) Filed: May 7, 2012

(65) Prior Publication Data

US 2012/0323722 A1    Dec. 20, 2012

Related U.S. Application Data

(63) Continuation of application No. 11/382,636, filed on May 10, 2006, now Pat. No. 8,175,920, which is a continuation-in-part of application No. 11/242,214, filed on Sep. 30, 2005, and a continuation-in-part of application No. 11/021,838, filed on Dec. 24, 2004, now abandoned, and a continuation-in-part of application No. 10/853,977, filed on May 25, 2004, now abandoned.

(51) Int. Cl.
*G06Q 30/00* (2012.01)
*G06Q 30/02* (2012.01)

(52) U.S. Cl.
CPC ........ *G06Q 30/0238* (2013.01); *G06Q 30/0275* (2013.01)
USPC .................................... 705/14.38; 705/14.71

(58) Field of Classification Search
CPC ....................... G06Q 30/0238; G06Q 30/0275
USPC ................................. 705/14, 15, 14.71, 14.38
See application file for complete search history.

(56) References Cited

U.S. PATENT DOCUMENTS

| | | | | |
|---|---|---|---|---|
| 5,163,087 A | * | 11/1992 | Kaplan | 379/93.03 |
| 5,623,404 A | * | 4/1997 | Collins et al. | 705/7.17 |
| 5,699,416 A | * | 12/1997 | Atkins | 379/115.01 |
| 5,802,493 A | * | 9/1998 | Sheflott et al. | 705/1.1 |
| 5,848,403 A | * | 12/1998 | Gabriner et al. | 706/13 |
| 5,903,635 A | * | 5/1999 | Kaplan | 379/112.01 |
| 5,920,846 A | * | 7/1999 | Storch et al. | 705/7.14 |
| 5,937,390 A | * | 8/1999 | Hyodo | 705/14.61 |
| 6,088,648 A | * | 7/2000 | Shah et al. | 701/117 |
| 6,134,318 A | * | 10/2000 | O'Neil | 379/266.01 |
| 6,324,519 B1 | * | 11/2001 | Eldering | 705/14.66 |
| 6,332,127 B1 | * | 12/2001 | Bandera et al. | 705/14.55 |
| 6,381,603 B1 | * | 4/2002 | Chan et al. | 707/724 |
| 6,400,941 B1 | * | 6/2002 | Nara | 455/422.1 |
| 6,430,486 B1 | * | 8/2002 | Diaz et al. | 701/31.4 |

(Continued)

OTHER PUBLICATIONS

"Non Final Office Action", U.S. Appl. No. 10/853,977, Mailing Date: Dec. 23, 2008.

(Continued)

*Primary Examiner* — James W Myhre
(74) *Attorney, Agent, or Firm* — IPSG, P.C., Intellectual Property Law

(57) ABSTRACT

A subscriber-based sales leads exchange system for efficiently maximizing revenue to lead sellers and for providing high quality, temporally relevant sales leads to lead buyers based on a transaction between a lead seller and a customer of said lead seller.

15 Claims, 3 Drawing Sheets

(56) References Cited

U.S. PATENT DOCUMENTS

| | | | |
|---|---|---|---|
| 6,470,079 B1* | 10/2002 | Benson | 379/114.13 |
| 6,487,538 B1* | 11/2002 | Gupta et al. | 705/14.66 |
| 6,578,005 B1* | 6/2003 | Lesaint et al. | 705/7.14 |
| 6,633,900 B1* | 10/2003 | Khalessi et al. | 709/202 |
| 6,694,234 B2* | 2/2004 | Lockwood et al. | 701/31.5 |
| 6,700,972 B1* | 3/2004 | McHugh et al. | 379/265.13 |
| 6,970,830 B1* | 11/2005 | Samra et al. | 705/7.28 |
| 7,069,333 B1* | 6/2006 | Morris et al. | 709/232 |
| 7,236,942 B1* | 6/2007 | Walker et al. | 705/14.65 |
| 7,542,919 B1* | 6/2009 | Mueller et al. | 705/16 |
| 2001/0014868 A1* | 8/2001 | Herz et al. | 705/14 |
| 2002/0077750 A1* | 6/2002 | McDonald et al. | 701/213 |
| 2002/0077876 A1 | 6/2002 | O'Meara et al. | |
| 2002/0111154 A1 | 8/2002 | Eldering et al. | |
| 2002/0143619 A1* | 10/2002 | Laurie | 705/14 |
| 2002/0188702 A1 | 12/2002 | Short, III et al. | |
| 2002/0194069 A1 | 12/2002 | Thakur et al. | |
| 2003/0033184 A1 | 2/2003 | Benbassat et al. | |
| 2003/0149618 A1 | 8/2003 | Sender et al. | |
| 2003/0220866 A1 | 11/2003 | Pisaris-Henderson et al. | |
| 2003/0236598 A1 | 12/2003 | Villarreal Antelo et al. | |
| 2004/0093296 A1 | 5/2004 | Phelan et al. | |
| 2005/0267803 A1 | 12/2005 | Patel et al. | |
| 2006/0095326 A1 | 5/2006 | Sandhu | |
| 2006/0195385 A1 | 8/2006 | Khetrapal et al. | |
| 2006/0242017 A1* | 10/2006 | Libes et al. | 705/14 |
| 2006/0271438 A1* | 11/2006 | Shotland et al. | 705/14 |
| 2007/0143187 A1 | 6/2007 | Gottfurcht | |
| 2009/0112681 A1 | 4/2009 | Krishnan et al. | |

OTHER PUBLICATIONS

"Final Office Action", U.S. Appl. No. 10/853,977, Mailing Date: Jun. 16, 2009.

"Final Office Action", U.S. Appl. No. 11/021,838, Mailing Date: Oct. 28, 2008.

"Final Office Action", U.S. Appl. No. 11/021,838, Mailing Date: Nov. 2, 2010.

"Non Final Office Action", U.S. Appl. No. 11/021,838, Mailing Date: Apr. 16, 2009.

"Final Office Action", U.S. Appl. No. 11/242,214, Mailing Date: Nov. 12, 2008.

"Non Final Office Action", U.S. Appl. No. 11/242,214, Mailing Date: Mar. 31, 2008.

"Non Final Office Action", U.S. Appl. No. 11/242,214, Mailing Date: Apr. 29, 2009.

"Non Final Office Action", U.S. Appl. No. 11/242,214, Mailing Date: Jun. 21, 2012.

"Final Office Action", U.S. Appl. No. 11/382,636, Mailing Date: Feb. 24, 2011.

"Non Final Office Action", U.S. Appl. No. 11/382,636, Mailing Date: Aug. 11, 2010.

"Non Final Office Action", U.S. Appl. No. 11/382,636, Mailing Date: Sep. 14, 2011.

"Final Office Action", U.S. Appl. No. 12/501,209, Mailing Date: Aug. 14, 2012.

"Non Final Office Action", U.S. Appl. No. 12/501,209, Mailing Date: Dec. 8, 2011.

"Non Final Office Action", U.S. Appl. No. 11/561,495, Mailing Date: Jul. 23, 2010.

"Zoneedit Network Look Up Tool", http://www.zoneedit.com/lookup.html as archived by http://web.archive.org, Aug. 15, 2001.

Haugen at al., "Scheduling to Improve Field Service Quality", Summer 1999, Decision Sciences, 30, 3, ABI/Inform Global, pp. 783-804.

Incantalupo, Tom "Week in Wheels/ Road Test/ A Phone System that Reaches Out", Newsday, Friday Aug. 29, 1997, 5 pages.

McDermott, Irene E., "Classified with Class: Superior Subject Sites", Information Today, Inc., Apr. 2000, 9 pages.

Paz, et al., "Maintenance Scheduling: Issues, Results and Research Needs", 1994, International Journal of Operations & Production Management, v14n8. pp. 47-69, Dialog 00956565 96-05958.

Smith, Russ "IP Address: Your Internet Identity", Consumer.net Mar. 29, 1997, pp. 1-3.

* cited by examiner

SYSTEM FOR EXCHANGING SALES LEADS

RELATED APPLICATIONS

This continuation application claims priority under 37 CFR 1.53(b) of and claims the benefit under 35 U.S.C. .sctn.120 to a commonly assigned patent application entitled "SYSTEM AND METHOD FOR EXCHANGING SALES LEADS", application Ser. No. 11/382,636 filed on May 10, 2006 and issued as U.S. Pat. No. 8,175,920 on May 8, 2012, which is a continuation-in-part of Ser. No. 11/242,214 filed Sep. 30, 2005, Ser. No. 11/021,838 filed Dec. 24, 2004 now abandoned and Ser. No. 10/853,977 filed May 25, 2004, now abandoned all incorporated herein by reference.

BACKGROUND

The invention, relates in general to systems and methods for exchanging sales leads. In particular, the invention relates to computer-implemented systems and techniques that allow a seller to improve revenue generation from the sale of complementary products/services sales leads while providing temporally-relevant information to customers to enable customers to obtain high quality complementary products/services.

Marketing and advertising costs often represent a large percentage of operating costs for companies engaged in the sales of products and/or services (products/services). Corporate marketing strategists expend significant resources to determine how best to optimize marketing and advertising campaigns to target potential customers at the lowest cost. The potential customer information is often referred to sales leads and can include one or more sub-categories, for example, suspects which are defined generally as possible customers, and prospects which are defined generally as suspects who have indicated a heightened willingness to purchase the products/services.

One technique that marketing strategists employ is to develop an ideal customer profile and audience, and suitable means for communicating with the ideal audience, such as direct mail, telephone solicitations, advertising in trade publications, trade shows, or seminars. This is generally a costly exercise for most companies, especially in mature competitive markets. Companies typically monitor their cost per lead or cost per prospect as a key performance indicator (KPI) for their marketing campaign. As a practical matter, marketing is only effective when certain conditions are met, e.g., a prospect must have the ability, willingness, and readiness to buy before a direct sate can be consummated.

It turns out that many customers who are interested in specific product/services may also be interested in complementary products/services (i.e., additional products/services related to the products/services already purchased). A conventional example of cross-selling to such customer leads include the familiar United States Post Office's Mover Package, which contains advertisements targeting customers who are relocating. The underlying common event is the relocation. The mover package contains advertisement flyers from cable companies, satellite TV companies, DSL providers, satellite radio, cell phone companies, rental companies, storage companies, moving companies, real estate, mortgage brokers and so forth. These are complementary products/services to the service already utilized, i.e., the Post Office's Mover Package.

Other conventional examples of cross-selling include, for example, up-selling complementary products at the point, of sale based on the current purchase or purchasing history of the customer. These companies include, for example, online bookstores or grocery store check-out counters and they tend to promote products/services of the same company. Companies have also extracted past leads from a company's existing customer database and then sells those leads to other companies. Other paradigms such as mining data from the internet to develop a predictive model for targeting potential customer leads also exist. These sales leads can then be sold to other companies to realize revenue for the company selling the leads.

However, there are disadvantages to all the above-mentioned approaches. From the perspective of the company buying the leads, for example, there is insufficient control over how sales leads are selected and/or little assurance of the quality of the leads and/or whether they wish to pay for particular leads, and how much for the leads. In the Post Office example, all complementary products/services companies bear the cost of priming and distributing the advertisements although some movers/customers clearly cannot take advantage of certain products/services advertised (e.g., a mover moving out of the country would not be interested in the purchase of a new cable-vision package). Thus, from the perspective of the complementary products/services sellers who could not take advantage of certain movers leads, the printing/distributing/advertising costs attributed to such movers/customers are essentially wasted.

From the perspective of the company that already consummated the transaction, revenue is not maximized from the information available through the consummated transaction. As mentioned earlier, certain leads are more likely to produce a sale than others. However, there exist no mechanisms for efficiently allowing a company to qualify a hot prospect from a lukewarm prospect on behalf of a particular complementary products/services provider and to obtain more revenue from a hot prospect versus a lukewarm prospect.

Further, there is a risk associated with referral. A good customer who suffered through a had experience with a complementary products/services provider may associate the experience with the referring company, and may resent the fact that she has suffered because of "bad information" provided by the referring company. Yet current lead referral or lead utilization paradigms do not furnish sufficient information to the referring company to enable to the referring company to make a decision regarding whether to refer a customer to a particular company that offers a complementary product/service.

The invention disclosed herein aims at solving these and other problems associated with prior art techniques of exchanging sales leads.

SUMMARY OF THE INVENTION

The invention relates, in an embodiment, to a computer-implemented method for exchanging sales leads among a plurality of companies, the computer-implemented method being implemented via a computer network. The method includes receiving profile data pertaining to the plurality of companies and receiving offering data pertaining to at least one of a product and a service offered by at least a first company of the plurality of companies. The method also includes providing a first data presentation arrangement enabling a second company of the plurality of companies to view the data pertaining to the at least one of the product and the service and to facilitate ascertaining by the second company whether the at least one of the product and the service represents a complementary offering with an offering of the second company. The method additionally includes accepting bid data from at least a second company of the plurality of companies, the bid data pertaining to a bid for a price that the second company is willing to pay when a transaction involving the at least one of the product and the service is conducted by customer of the first company. The method further includes providing a second data presentation arrangement enabling the first company to accept or reject the bid. The method also includes executing sales lead data exchange pertaining to the customer if the bid is accepted by the first company, including providing qualification questions furnished by the second company to the first company for presenting to the customer and providing profile data of the customer, including the responses to the qualification questions, from the first company to the second company.

In another embodiment, the invention relates to a computer-implemented system for exchanging sales leads among a plurality of companies. The system includes a database for storing profile data pertaining to the plurality of companies and offering, data pertaining to at least one of a product and a service offered by at least a first company of the plurality of companies. The system also includes first data presentation arrangement means for enabling a second company of the plurality of companies to view the data pertaining to the at least one of the product and the service and to facilitate ascertaining by the second company whether the at least one of the product and the service represents a complementary offering, with an offering, of the second company. The system additionally includes means for accepting bid data from at least a second company of the plurality of companies, the bid data pertaining to a bid for a price that the second company is willing to pay when a transaction involving the at least one of the product and the service is conducted by customer of the first company. The system further includes means for providing, a second data presentation arrangement enabling the first company to accept or reject the bid. The system also includes means for executing sales lead data exchange pertaining to the customer if the bid is accepted by the first company, including providing qualification questions furnished by the second company to the first company for presenting to the customer and providing profile data of the customer, including the responses to the qualification questions, from the first company to the second company.

In yet another embodiment, the invention relates to a computer-implemented method for exchanging sales lead between a lead seller and a plurality of prospective lead buyers. The method includes providing attribute data pertaining to the lead seller and at least one of a product and service offered by the lead seller to the plurality of prospective lead buyers. The method also includes accepting bids from the prospective lead buyers for a sale lead from the lead seller, the bids being made for profile data of customer of the lead seller if the customer interacts with the lead seller pertaining the one of the product and service. The method additionally includes transmitting the profile data of the customer to at least one of the plurality of prospective lead buyers if a bid of one of the plurality of prospective lead buyer is deemed a winning bid.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1:
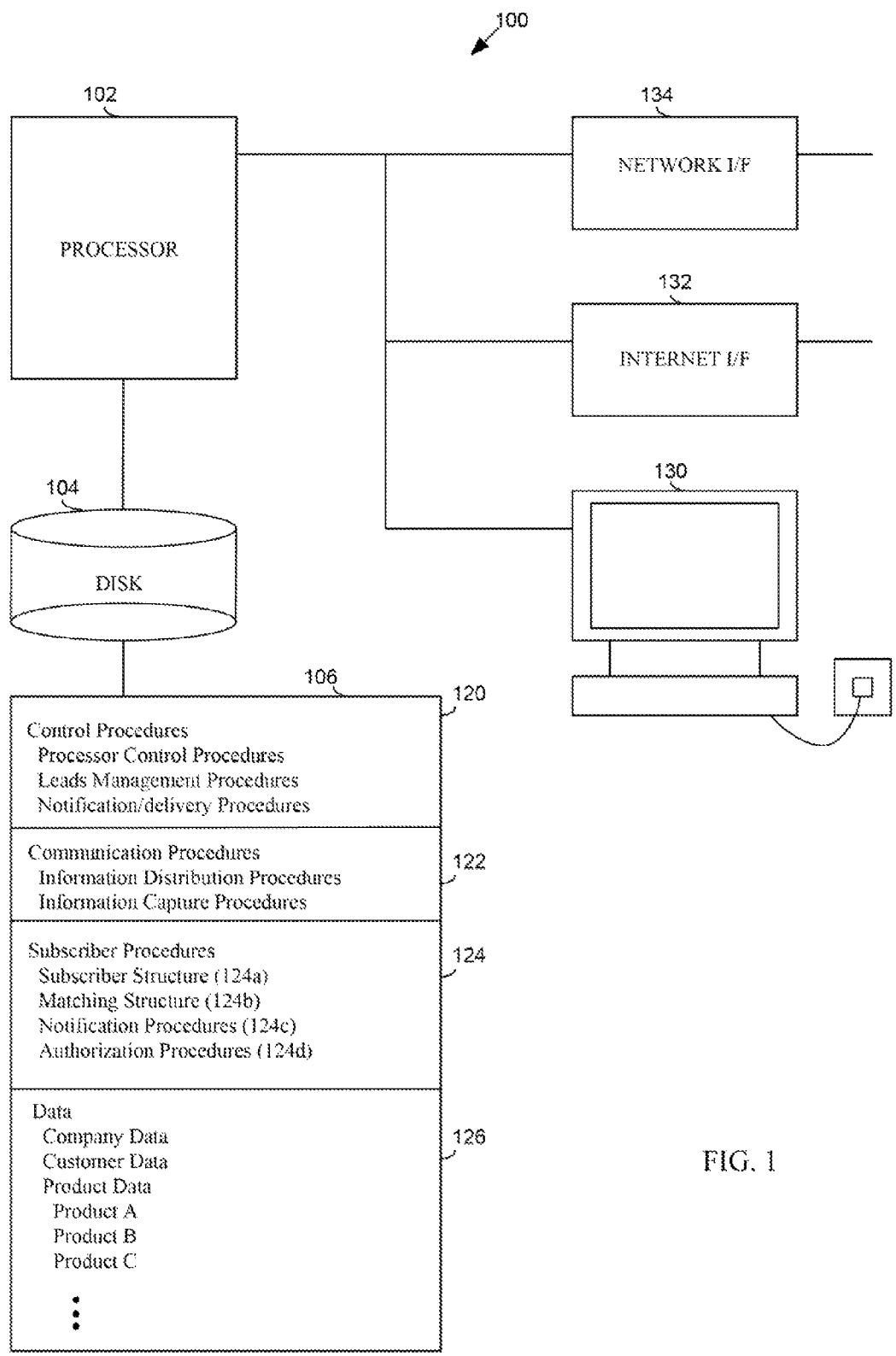
FIG. 1 illustrate a server environment employed to implement the sales leads cross-selling, service in accordance with an embodiment of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to can out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

For ease of reference, the company that already completed (or initiated, or partially completed) the sale of a product/service with a customer is referred to herein as the lead seller (LS). The LS may be able to generate valuable sale loads even if the transaction with the customer is not completely consummated/completed since the information regarding a customer's buying intention may already furnish valuable information to other sellers. For example, a customer's detailed inquiry regarding the technical abilities of a high definition television set would likely indicate a likelihood to buy, at some time, complementary products such as movie discs or services such as movie downloads. Thus, the term "transaction" or "transacted" is employed herein to associate a consumer or buyer with a particular product or service even if, for example, the customer is only at the exploratory stage or even if the sale is not completely consummated. This transaction, or the transacted goods/service, produces customer data, which may be subsequently transformed into leads and sold to generate additional revenue for the lead seller even if, as mentioned, the lead se has not completed the sale to the customer.

The term "customer" is employed herein to include the consumer of the goods or services offered by either the lead selling company (also lead seller) or the lead buying company (also lead buyer). A company that wishes to offer the complementary goods/services is referred to herein as the prospective lead buyer (PLB). A prospective lead buyer who actually purchased or under contract to purchase a sales lead is referred to herein as the actual lead buyer (ALB). For example, if a lead seller enters into a contract with a prospective lead buyer to refer a complementary offering (i.e., complementary goods or service) of the prospective lead buyer to the customer or to provide customer's information as sales leads to the prospective lead buyer, the prospective lead buyer is obligated to pay for the referral and becomes an actual lead buyer. The complementary offering by the actual lead buyer that is presented to the customer is referred to herein as an approved offering. A product/service may be judged by a prospective lead buyer as complementary to the prospective lead buyer's product/service based on any criteria established by the prospective lead buyer, including without limitation technological or lifestyle compatibility, geographical area compatibility, convenience enhancement for the purchased product/service, etc.

In embodiments of the invention, companies subscribe to the sales leads cross-selling system to sell and buy sales leads. Lead sellers provide attribute data pertaining to themselves and their offerings. For example, an automobile dealership may provide attribute data pertaining, to its location, the types of cars it sells, the types of services it offers. A company can be a lead seller for some offerings and a potential/actual lead buyer for other offerings. The attribute data pertaining to companies/offerings are then stored in a database.

A potential lead buyer then reviews the attribute data to determine whether an offering provided by a lead seller is complementary to the offerings provided by that potential lead buyer. In an embodiment, the review may be performed using any data presentation arrangement that allows a person or software to view and/or filter and/or search through a database or a listing. In a typical situation, multiple lead buyers would be interested in obtaining sales leads due to the occurrence of a transaction between a lead seller and a customer with respect to an offering by the lead seller. For example, there may be multiple aftermarket high performance stereo dealers and installers interested in knowing the identity of a customer who just purchased a luxury performance sedan.

In an embodiment, these aftermarket high performance stereo dealers bid for the sales lead by submitting their bids to the lead seller. The bids may be based on a bulk purchase of sales leads (e.g., price per X numbers of sales leads per given amount of time) or may be based on individual characteristics of the customer individual transaction. In other words, the bids can be for a block of future sale leads, or for each sale leads as the transaction data becomes available.

If the bids are based on hulk purchase, the contract for the sales leads may be entered into before the customer transactions. If the bids are based on characteristics of individual transactions, the contract creates payment obligations when the transaction attribute data meets certain conditions established by the winning bidder (e.g., the type of car, the demographics of the customer, and/or whether the customer answers certain questions satisfactorily, etc.). The bids may be manually generated by the prospective lead buyers and submitted or may be computer-generated based on pre-defined criteria established by the prospective lead buyers.

In an embodiment, once the prospective lead buyer bids for and wins, the prospective lead buyer is obligated to pay for the leads delivered. In an embodiment, the prospective lead buyer is only obligated to pay for leads that satisfy certain additional predefined criteria, in addition to the complementary determination made by the prospective lead buyer. Alternatively or additionally, the prospective lead buyer is only obligated to pay for all sales leads that they bidded for and won but is also obligated to pay a premium for leads that satisfy certain additional predefined criteria.

In an embodiment, the prospective lead buyer is given an opportunity to qualify the sales lead to determine whether the sales lead should be purchased and/or how much the sales lead is worth. In the automobile dealer example, a prospective lead buyer may be given the option to ask a series of qualifying questions through the lead seller. For example, as part of the car purchase experience, the lead seller may ask certain qualifying questions on behalf of the prospective lead buyer. The questions may be, for example, "do you travel long distance often?" and/or "do you listen to music or news when you travel?" and/or "do you own a large music collection?" A particular lead buyer may specify that they would only buy the sales lead if one or more of the qualifying questions (and/or if a specific qualifying question) is satisfactorily answered. The lead buyer and/or the lead seller may establish different pricing levels for different leads quality. For example, a customer who answered affirmatively to all three qualifying questions (i.e., a "hot" prospect) may command a different price as a sales lead than a customer who answered affirmatively on only one or two questions (i.e., a "lukewarm" lead). As another example, a customer who answers affirmatively to a "key" question may command a higher price than one who fails the same "key" qualifying question.

In this manner, the process of qualifying leads becomes highly granular. In addition to the initial judgment regarding whether the transaction is complementary, the prospective lead buyer is allowed to use his judgment to craft qualifying questions to be posed by the lead seller. These questions tend to be questions that are, in the experience of the lead buyer, most likely to yield a productive sale. Thus, the expertise of the individual complementary goods/services providers are leveraged.

Lead buyers and lead sellers can also rate one another based on the quality of the leads provided, the feedback from customers, etc. Thus a lead seller who consistently provide high quality prospects may enjoy a better rating (and may enjoy higher bidding prices from prospective lead buyers) than a lead seller who consistent provide sales leads that do not lead to consummated sales for the actual lead buyers. A lead buyer who is judged by customers to have provided superior products/services may enjoy a better rating than a lead buyer who are judged by customers as poor providers.

These ratings may factor into the bidding price by the prospective lead buyers or may be used by the lead seller to determine whether to accept a bid. Another factor in bid pricing may pertain to whether the bid is for an exclusive referral or a nonexclusive referral. If the bid is for an exclusive referral, the Miming actual lead buyer identity will be furnished to the customer as a referral exclusively. If the bid is for a non-exclusive referral, there may be multiple winning actual lead buyers and their identities will be provided to the customer in a non-exclusive manner. Exclusive bids tend to be higher than non-exclusive bids as lead sellers require a high exclusive bid to make up for the lost revenue opportunity from other non-exclusive bidders.

Another factor in bid pricing may pertain to whether there is a "success fee" associated with the bid. For example, a bid from a lead buyer may be low but may be associated with a "success fee" which is payable by the lead buyer to the lead seller if the referral turns into an actual sale. In some cases, the presence of a success fee may make an otherwise low bid more attractive to the bid seller, particularly if the lead seller is confident that the customer is likely to purchase the goods/services offered by the complementary goods/service provider.

For service providers requiring the personal presence of a human service personnel, distance to the location where the service is to be rendered may also factor into the bid price. A prospective lead buyer may factor into the bid price for a particular lead seller (or customer) across town the cost of driving across town to service customers of that seller and may therefore provide a lower bid than the bids provided to a lead seller (or customer) that is located closer. In certain industries, geographical restrictions may preclude certain service providers from providing the service in another "territory" and distance may be employed by either the prospective lead buyer or the lead seller to determine whether to provide/accept a bid.

In an embodiment, the lead sellers have the option to accept or reject a lead based on price, rating, and/or other factors. For example, the automobile dealer lead seller may reject a stereo installer based on the fact that the stereo installer is located too far from the dealership and is thus too inconvenient for the customer to obtain follow-up service. As another example, the automobile dealer may reject bids from a particular stereo installer based on the fact that there have been numerous complaints from customers regarding that stereo installer's practice. As yet another example, the automobile dealer/lead seller may also reject bids from competitive dealerships who also happen to sell/install high-end stereo systems because the automobile dealer/lead seller does not want to risk losing future sales of automobiles to the same customer. By allowing the seller control over which bid to accept, the seller can maximize the bid price while minimizing the possibility of antagonizing the customer with bad referrals and/or losing the customer to the competition.

In an embodiment, prospective lead buyers who did not win the bids do not have to pay for the sales leads. Thus, unlike the Post Office example in which all contracting complementary product/service providers pay for the printing/advertising of the materials promoting the complementary goods/services, the cost is borne only by lead buyers who is most interested in utilizing the sales leads.

In embodiments of the invention, most or all of the aforementioned steps are computer-implemented to shorten the time required to identify approved complementary offerings from winning prospective lead buyers to enable to lead seller to present the referral information to the customer while the opportunity presents itself and/or to rapidly provide the sales leads information to the winning lead buyer.

Thus, in the automobile dealership example, the transaction between the customer and the automobile dealer service agent (which may be a sales person or the selling website) creates transaction data that is employed by software to generate a sales lead. Computer software then identifies an actual lead buyer from the list of subscribing/bidding prospective lead buyers and the referral information (such as the identity of the actual lead buyer(s) and/or their offerings) may be presented to the customer while the customer is still in the showroom or still conducting the original automobile car buying transaction on the website. In an embodiment, computer-generated scripts allow the qualifying questions from the actual lead buyers to be woven into the transaction so that the process of obtaining qualifying, information for the complementary goods/service providers and the process of presenting referral information can occur in a seamless, conversationally natural manner.

It should be recognized that in some cases, it is not absolutely necessary to provide the identity information of the actual lead buyer to the customer. The sales lead cross-selling may involve, in an embodiment, providing the identity of the customer to the actual lead buyer and let the actual lead buyer perform his own sales/marketing effort. With respect to the automobile purchase example, the identity and/or product data of the high-end stereo suppliers/actual lead buyers may be provided to the customer by the automobile dealership/lead seller in an embodiment. In an alternative embodiment, the identify of the customer (and other relevant data) is provided to the high-end stereo suppliers/actual lead buyers in a temporally relevant mariner to allow the high-end stereo suppliers/actual lead buyers to perform their own marketing to this customer on their own terms.

In another embodiment, a pre-computed time-delay is provided so that some time is allowed to pass before the referral information is provided. For example, a customer buying a baby crib may generate transaction data that would be relevant to a toy seller six months in the future, to a baby book seller two years into the future, to a private kindergarten four years into the future. Computer software implementing, the invention would factor in the time delay and execute the bidding and/or referral in a temporally relevant manner. Since a transaction may generate multiple sales leads bidding opportunities into the future, revenue for the lead seller is maximized.

At the back-end, the sales leads data (e.g., customer identity, related transaction data, etc.) may be provided to the actual lead buyer through a variety of communication means including email, file exchanging, phone, fax, mailing, etc. Further, payment is settled for the sale of the sales leads and/or the presentation of the identity of the actual lead buyer to the customer. If a success fee is involved, payment may be settled for the successful sale of the complementary goods/services at a later date. If the sales leads cross-selling system is operated as a business independent of the lead sellers/lead buyers, the company operating the sales leads cross-selling system may collect the payment from the actual lead buyer(s) and forward the payment to the lead seller(s) after subtracting an appropriate fee for operating the sales leads cross-selling the service.

The features and advantages of the invention may be better understood with reference to the figures and discussions that follow. FIG. 1 illustrate a server environment 100, representing the computer system employed to implement the sales leads cross-selling service in accordance with an embodiment of the present invention. Server environment 100 includes a processor 102 and a storage device 104, for example, a disk drive. The storage device stores information 106 including control procedures and data for implementing the sales leads cross-selling service. The server 100 further includes interfaces 132, 134 to communication with other computers and networks as well as an administrative interface 130 for managing server environment 100.

Interfaces 132 and 134 are configured to communicate with lead sellers and prospective/actual lead buyers or in some cases, even the buyers themselves if the referral data pertaining to the complementary providers are to be sent to the customers directly. Through interfaces 132 and 134, the lead sellers and prospective/actual lead buyers can provide (via computers that are coupled to communicate with interfaces 132 and/or 134, for example) data pertaining to themselves, the products/services they offer, the transaction data pertaining to the transaction that generate the sales lead, the bidding data, any communication to facilitate the bidding and/or contract formation, acceptance data that forms a contractual agreement between a lead seller and one or more actual lead buyers, payment data, and/or the like. Interfaces 132 and 134 may also be coupled to communicate with other networks (e.g., fax, phones via computer-generated voices, short message services or SMS messages, instant messaging messages, etc.) to obtain and/or provide some or all of the aforementioned data. Preferably, the data is exchanged through the Internet, via a secure or unsecured communication arrangement, in an embodiment.

In an embodiment, disk 104 works cooperatively with on-board random-access-memory (RAM) to implement a variety of procedures and stores a variety of data. For example, the memory 126 is configured as a database to store information regarding company information, company's value proposition, products/services, etc. In an embodiment, the products/services data stored in the memory include a plurality of attributes that indicate, for example, the name, use, price, and other information. In an embodiment, the attributes include additional details, for example, when the product/service might be useful, under what conditions the product/service might be used, the name of the manufacturer or distributor, etc.

A subscriber structure 124a manages each lead seller/lead buyer that communicates with the server environment 100 over the internet interface 132 or network interface 134. The subscriber structure represents the interface software coupled with authorization procedures 124d that control access to the data and log the usage.

Depending on whether a particular company acts as a lead seller or a lead buyer, a matching structure 124b is configured to identify complementary goods and services, to perform the bidding and negotiation, to accept the bidding terms and/or reject unacceptable bids, etc. A notification procedure 124c is employed to communicate with the lead seller (if the company is acting as a lead buyer) or with the lead buyer (if the company is acting as a lead seller).

Procedures 122 and 120 represent control and communication procedures that are global to all companies. Thus, communication procedures include global information distribution procedures and information capture procedures designed to govern the flow of information between lead buyers and lead sellers (and optionally to/from customers). Control procedures 120 include process control procedures lead management procedures, and notification/delivery procedures to manage the respective processes at a global level. FIG. 1 represents an example implementation and other implementations are possible given the description herein.

Figure 2:
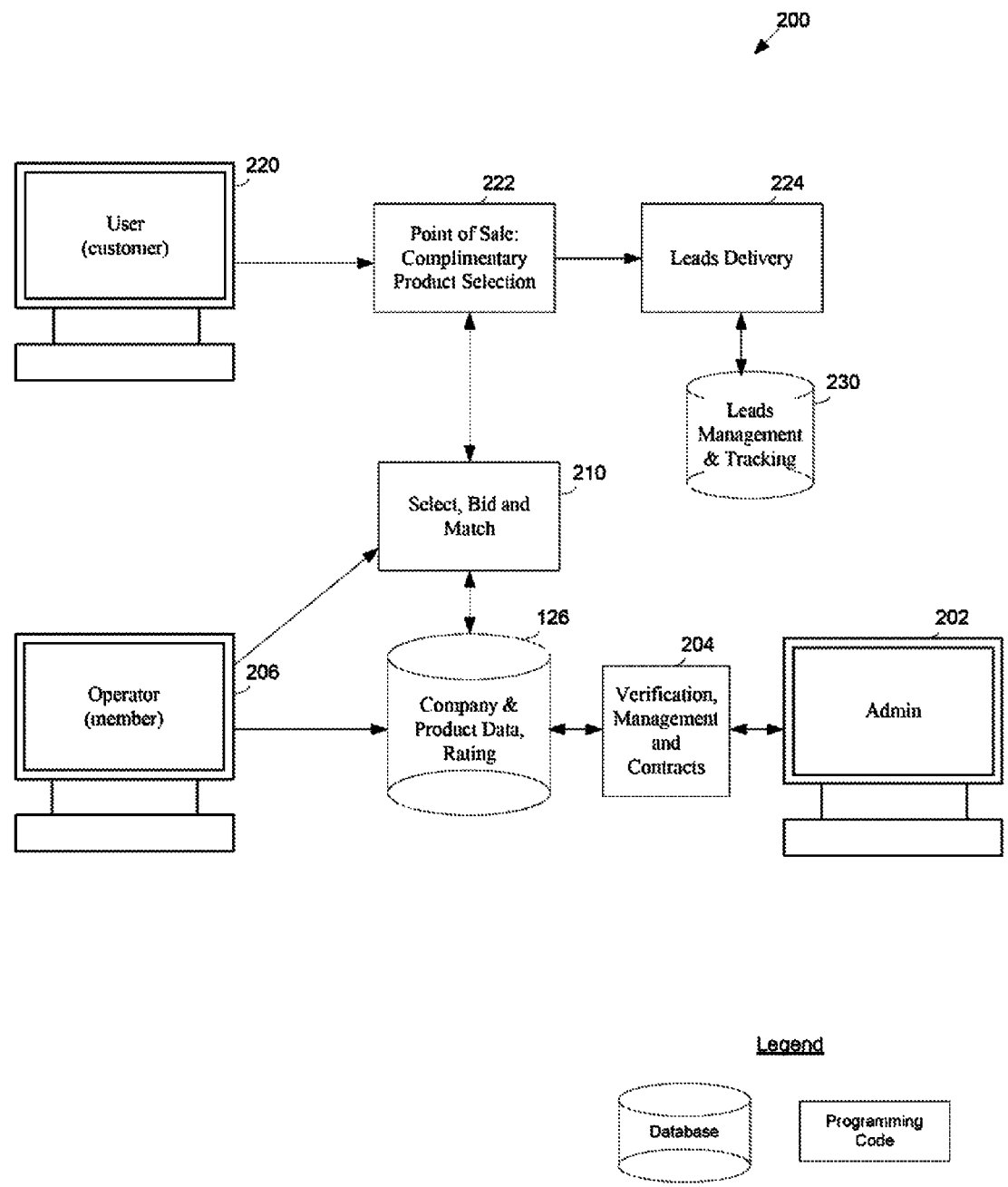
FIG. 2 shows, in accordance with an embodiment, various components of the sales leads cross-selling system.

FIG. 2 shows, in accordance with an embodiment, various components of the sales leads cross-selling system. In FIG. 2, subscriber 206 represent lead sellers and lead buyers, while customer 220 represent a customer who is conducting a transaction with a lead seller (via a website in the example of FIG. 2). Subscribers 206 enter company and product data, preferred qualification questions to be posed, as well as ratings for past sale leads referrals, into a database 126. Table 1 shows some example profile and product data that may be entered.

TABLE 1

| Company | Profile |
|---|---|
| Dish Planet | Dish Planet is an authorized dealer for DISH Network and DIRECTV. We specialize in satellite-based television products/services to residential and commercial end users. We also manage the installation of all equipment needed to utilize and view the satellite service. |
| Subscription type | Buyer and Seller |
| Category | Satellite TV entertainment |

TABLE 1-continued

| Company | Profile |
|---|---|
| Product 1 (Seller) DIRECTV Satellite TV subscription | Product 1 Seller, Attributes Pre-Qualification Questions: 1. Did you ever subscribe to DIRECTV in the past? (Reqd. No) 2. Do you have a credit card? (Reqd. Yes) 3. Do you live in an apartment (Reqd. No) |
| Product Value proposition | Lower your cable bills with all Digital programming starting at $30/mo, with Free HDTV receiver and Free Installation. |
| Delivery Options | Phone, email, database |
| Delivery times | M-F, 6AM-9PM PST, S-S; None |
| Maximum Leads Available | M-F, 300 per work day |
| Minimum $/lead | $5 |
| Geographic coverage | CA, OR, WA, AZ, TX, WI, IL, MI, MN |
| Payment method | Credit Card |

Referring back to FIG. 2, the identity of the subscriber, his access privilege, and other back-end functions such as account management and contract data, payment, etc.) are performed by procedures 204. If needed, an administrative console 202 is employed to manage various aspects of database 126 and procedures 204.

At point of sale 222, a transaction occurs. The transaction generates transaction data, which may be employed in an embodiment as a filter to identify the complementary products/services. Based on the information provided by the transaction that occurs at the point of sale 222, complementary products/services providers may select and bid for sales leads (210). Example bid data for a fictitious potential lead buyer ("Joe's Electronics") is shown in Table 2 below, in accordance with an embodiment of the present invention.

TABLE 2

| Company: Joe's Electronics | |
|---|---|
| Company Selected | Dish Planet |
| Product Selected | DIRECTV Satellite TV subscription |
| Max. Requested Leads/day | 50 |
| Period Leads requested | 09/30/2005 to 10/01/2005 |
| Days Leads requested | Monday, Thursday, Saturday |
| Daily Time Range for Leads Requested | 9AM to 8PM PST |
| Bid price per Lead | $5 |
| Delivery option | Phone, Ph# 800-333-3322 |
| Geographic coverage | CA |

Accepted bids form matches (210), which are then employed to determine to which lead buyer(s) the sales leads should be delivered (224). Leads are managed and tracked by procedures 230 to facilitate back-end settlement (e.g., payment for sales leads ratings, etc.).

Figure 3:
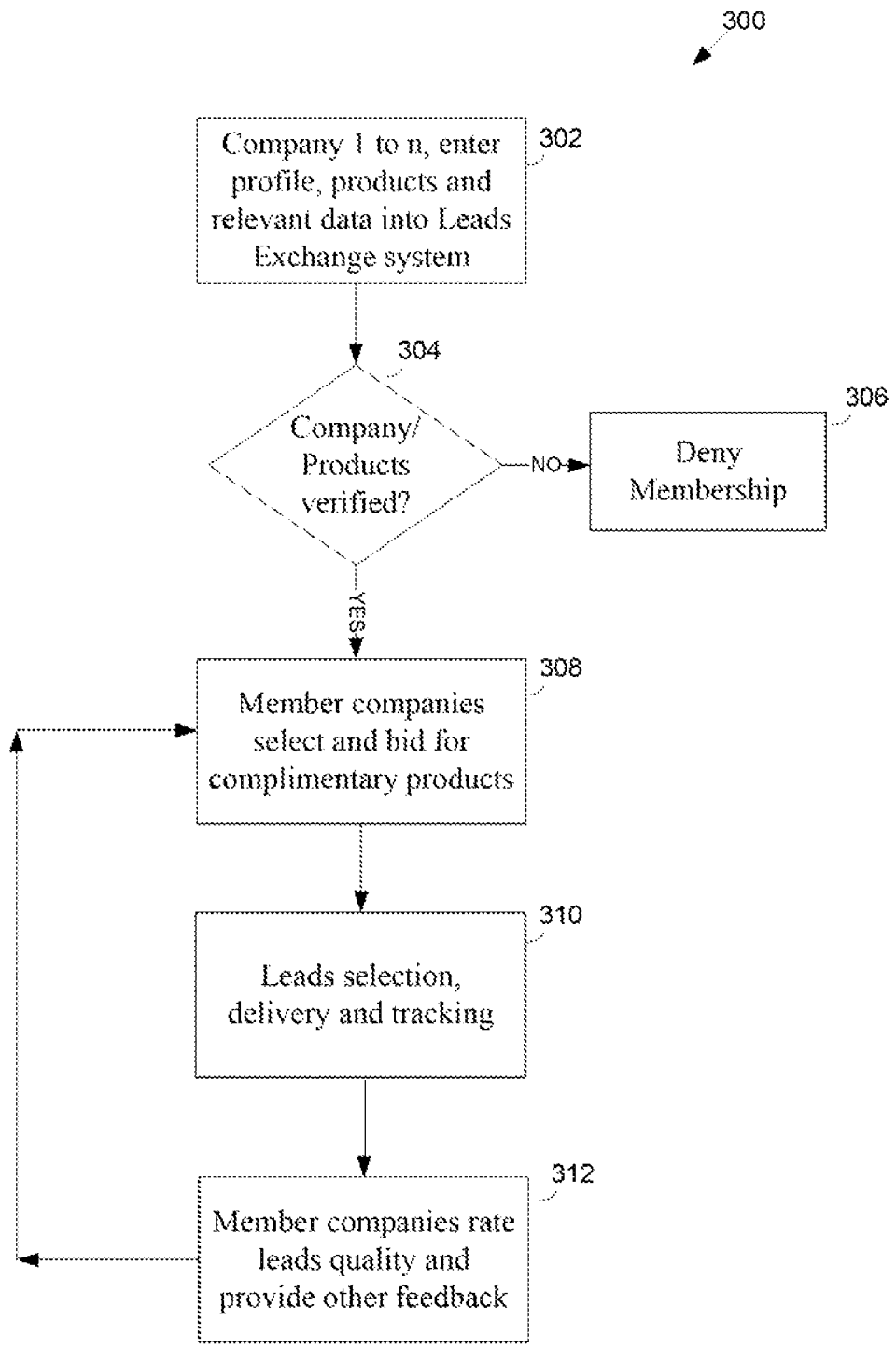
FIG. 3 shows, in accordance with an embodiment of the present invention, an example process flow for implementing sales lead cross-selling.

FIG. 3 shows, in accordance with an embodiment of the present invention, an example process flow 300 for implementing sales lead cross-selling. In step 302, the various lead seller and lead buyer companies enter their profiles, product and other relevant data It should be recognized that a given company may act as a lead seller for some products/services and/or a lead buyer for other products/services. In step 304, an operator of the lead-exchange service may verify the entered data to ensure that the company/product data is accurate and can be verified to prevent fraud. If verification is not possible, membership may be denied (306).

If the profile/product data is verified (yes branch of step 304), prospective lead buyers may view the profile/product data from the lead sellers and bid for leads (308) if they deem there is a complementary fit. Bidding and subsequent acceptance/rejection/negotiation give rise to contractual obligations to deliver sales leads as well as to pay for sales leads 310). Once the sales leads are delivered, the member companies may rate one another based on contractual performance, lead quality, customer feedback, etc. (312). Back-end settlement may also occur as part of step 312. The process continues as lead seller companies generate sales leads and prospective lead buyers bid for leads.

As can be appreciated from the foregoing, embodiments of the invention facilitate an efficient and highly scalable system for exchanging sales lead data Embodiments of the invention enable the lead seller companies to maximize the additional revenue from lead data by improving the lead quality (through the qualification questions and through temporally-relevant delivery of sides lead information and/or delivery of referral information to the customer) as well as by generating competitive bids from prospective lead buyers. Further, the lead seller is furnished a degree of control over the company or companies that would be referred to the customer (by, for example, deciding which bid to accept). The prospective lead buyers are furnished a degree of control over which leads to buy, how much to pay, and how the leads are qualified to lower the cost of lead acquisition as well as to improve the odds of a successful sale of a complementary product/service.

While this invention has been described in terms of several embodiments, there are alterations, permutations, and equivalents, which fall within the scope of this invention. For example, while reference is made to a server including a database, the database/code can also reside on a different server and be accessed over a network. Further, the mechanisms employed to present data, obtain data, accept bids, etc., may be implemented by a variety of techniques, including different pages on a web browser. These different pages for performing these different functions on the computing/telecommunication devices of the lead seller and lead buyers may be understood to represent different structures or means to accomplish the underlying tasks. Likewise, different procedures and code sections may be understood to represent different structures or means to accomplish the underlying tasks when executed at the computer arrangement that implements the sales leads exchange system.

Also, while the preferred network is the Internet, any communication network can be used in the invention. Also, while reference is made to sales leads, suspects, prospects, complementary products, services and related information, these terms are considered to be broadly defined to include customer attributes, product/service attributes and other characteristics to support a robust implementation of the invention. Thus the example of the figures refer only to a specific example embodiment and should not be construed as limiting.

It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented system for exchanging sales leads among a plurality of companies, said computer-implemented system being implemented via a computer network, said computer-implemented system comprising:
    a database for receiving and storing profile data pertaining to said plurality of companies and offering data pertaining to at least one of a product and a service offered by at least a first company of said plurality of companies;
    first data presentation arrangement structure configured for enabling a second company of said plurality of companies to view said data pertaining to said at least one of said product and said service and to facilitate ascertaining by said second company whether said at least one of said product and said service represents a complementary offering with an offering of said second company;
    matching structure configured for accepting bid data from at least a second company of said plurality of companies, said bid data pertaining to a bid for a price that said second company is willing to pay when a transaction involving said at least one of said product and said service is conducted by a customer of said first company;
    second data presentation arrangement structure configured for enabling said first company to accept or reject said bid; and
    sales lead data exchange structure for executing sales lead data exchange pertaining to said customer if said bid is accepted by said first company, including providing qualification questions furnished by said second company to said first company for presenting to said customer and providing profile data of said customer, including the responses to said qualification questions, from said first company to said second company.

2. The computer-implemented system of claim 1 wherein said accepting said bid data is responsive to geographic information furnished in one of said bid data and said profile data associated with said second company.

3. The computer-implemented system of claim 1 wherein said bid data includes an indication whether said bid is for an exclusive referral or a non-exclusive referral.

4. The computer-implemented system of claim 1 wherein said bid is based on bulk sales leads generated by said first company.

5. The computer-implemented system of claim 1 wherein said bid is based on a specific transaction by said first company.

6. The computer-implemented system of claim 1 wherein said bid includes a plurality of prices, a specific value of said bid is determined based on responses to said at least one qualification question after said customer responds to said qualifying questions.

7. The computer-implemented system of claim 1 wherein said transaction occurs at a point-of-sale, said at least one qualification question being presented to said customer while said customer is still conducting said transaction at said point-of-sale.

8. A computer-implemented system for exchanging sales leads between a lead seller and a plurality of prospective lead buyers, said computer-implemented system being implemented via a computer network, said computer-implemented system comprising:
    interface structure configured for providing attribute data pertaining to said lead seller and at least one of a product and a service offered by said lead seller to a plurality of computers interconnected via said computer network and accessible by said plurality of prospective lead buyers, wherein each of said plurality of prospective lead buyers offers at least one of a complementary product and a complementary service different from said at least one of a product and a service offered by said lead seller;
    a database configured for accepting bids from said plurality of prospective lead buyers for a sales lead from said lead seller, said bids being made for profile data of a customer of said lead seller interacting with said lead seller for said at least one of said product and service;
    subscriber structure configured for receiving via said computer network bid data from said plurality of prospective lead buyers, said bid data pertaining to bids for prices that each individual prospective lead buyer of said plurality of prospective lead buyers is willing to pay for at least a sales lead related to said transaction by said customer, said prices depending at least in part on specific characteristics of said customer as reflected in said profile data of said customer;

after at least a bid of at least one of said plurality of prospective lead buyers has been deemed a winning bid, monitoring structure configured for determining, responsive to said subscriber structure for receiving said bid data during said pendency of said transaction, said at least one of said plurality of prospective lead buyers to be a set of actual lead buyers;

after said determining, a sales lead data exchange structure configured for accepting, qualification questions from said set of actual lead buyers;

said sales lead data exchange structure providing said qualification questions to said lead seller for said lead seller to present at least one qualification question of said qualification questions to said customer as part of an interaction between said customer and said lead seller pertaining to said at least one of said product and said service to collect qualification data; and said sales lead data exchange structure transmitting said qualification data to said set of actual lead buyers, wherein a final price payable by said set of actual lead buyers to said lead seller for said sales lead data pertaining to said customer is a first price if said response by said customer has a first value and wherein said final price payable by said set of actual lead buyers to said lead seller for said sales lead data is a second price different from said first price if said response by said customer has a second value different from said first value.

9. The computer-implemented system of claim 8 wherein said winning bid is selected based on a set of criteria that includes geographic restriction.

10. The computer-implemented system of claim 8 wherein said winning bid represents a portion of a bulk purchase of sales leads from said lead seller.

11. The computer-implemented system of claim 8 further comprising invoicing said at least one of said plurality of prospective lead buyers for said winning bid.

12. The computer-implemented system of claim 8 further comprising providing a rating mechanism to at least one of said lead seller and said one of said plurality of prospective lead buyers to collect rating data pertaining to a sales lead exchange transaction that involves said profile data.

13. The computer-implemented system of claim 8 wherein a price associated with said winning bid is determined based on whether said winning bid is an exclusive winning bid or a non-exclusive winning bid.

14. The computer-implemented system of claim 8 wherein said winning bid is selected based on a set of criteria that includes a rating score resulting from past transactions involving said one of said plurality of prospective lead buyers.

15. The computer-implemented system of claim 8 further comprising providing identity data of said at least one of said plurality of prospective lead buyers to said customer.

* * * * *